US009501473B1

(12) United States Patent
Kong et al.

(10) Patent No.: US 9,501,473 B1
(45) Date of Patent: Nov. 22, 2016

(54) WORKFLOW PROCESS WITH TEMPORARY STORAGE RESOURCE RESERVATION

(75) Inventors: Chio Fai Aglaia Kong, San Jose, CA (US); Chirag Deepak Dalal, Maharashtra (IN); Ronald S. Karr, Palo Alto, CA (US)

(73) Assignee: Veritas Technologies LLC, Mountain View, CA (US)

( * ) Notice: Subject to any disclaimer, the term of this patent is extended or adjusted under 35 U.S.C. 154(b) by 1515 days.

(21) Appl. No.: 11/018,957

(22) Filed: Dec. 21, 2004

(51) Int. Cl.
*G06F 7/04* (2006.01)
*G06F 17/30* (2006.01)
*G06F 9/50* (2006.01)

(52) U.S. Cl.
CPC .............. *G06F 17/30* (2013.01); *G06F 9/50* (2013.01); *G06F 2209/5014* (2013.01)

(58) Field of Classification Search
CPC ........ G06F 9/50; G06F 21/62; G06F 3/0631; G06F 3/0665; G06F 2209/503; G06F 15/173; G06F 9/00; G06F 17/30; H04L 63/10
USPC ......................................................... 707/102
See application file for complete search history.

(56) References Cited

U.S. PATENT DOCUMENTS

| | | | | |
|---|---|---|---|---|
| 6,411,601 B1 * | 6/2002 | Shaffer et al. | ................. | 370/230 |
| 6,766,348 B1 * | 7/2004 | Combs | .................. | G06F 9/5083 709/226 |
| 7,308,529 B1 * | 12/2007 | Desai | .................... | G11B 15/689 711/111 |
| 2001/0029519 A1 * | 10/2001 | Hallinan et al. | .............. | 709/104 |
| 2003/0167329 A1 * | 9/2003 | Kurakake et al. | ............. | 709/226 |
| 2004/0098383 A1 * | 5/2004 | Tabellion et al. | .................. | 707/3 |
| 2004/0215780 A1 * | 10/2004 | Kawato | .......................... | 709/226 |
| 2005/0177546 A1 * | 8/2005 | Nakano | ............. | G06F 17/30067 |
| 2005/0188089 A1 * | 8/2005 | Lichtenstein et al. | ........ | 709/226 |
| 2005/0257003 A1 * | 11/2005 | Miyazaki | .............. | G06F 3/0605 711/114 |
| 2006/0085673 A1 * | 4/2006 | Nomoto | ................ | G06F 3/0605 714/6.12 |
| 2014/0082704 A1 * | 3/2014 | Chaddha et al. | ................. | 726/4 |

OTHER PUBLICATIONS

Appleby et al., "Policy-Based Automated Provisioning," IBM Systems Journal, vol. 43, No. 1, 2004, pp. 121-135.

* cited by examiner

*Primary Examiner* — Bruce Moser
(74) *Attorney, Agent, or Firm* — Campbell Stephenson LLP

(57) ABSTRACT

A method involves: detecting a storage resource indication within a workflow request and, in response to the storage resource indication, generating an availability indication. The storage resource indication indicates a storage resource (e.g., by directly or indirectly identifying or selecting the storage resource). The availability indication indicates that the indicated storage resource is not available for subsequent workflow requests. The availability indication is generated prior to allowing the consumer that generated the workflow request to use the storage resource. The workflow request can include a request to allocate a logical storage structure (e.g., a volume or logical disk). The logical storage structure is allocated in response to the workflow request. If the workflow request is denied or expires, the logical storage structure is deleted.

22 Claims, 5 Drawing Sheets

WORKFLOW PROCESS WITH TEMPORARY STORAGE RESOURCE RESERVATION

FIELD OF THE INVENTION

This invention corresponds to storage systems and, more particularly, to the use of a workflow process to allocate resources within a storage system.

BACKGROUND

Workflow processes are used to streamline processes that involve both manual and automatic operations. For example, a workflow process can be defined for the provisioning of storage resources. The workflow process defines what storage resources can be requested, who can request storage resources, who can approve of the requests, who can configure requested storage resources, and so on. The workflow process also defines and manages the procedure by which requests are generated, approved, and satisfied so that requests are handled in an efficient and orderly manner. For example, the workflow process can prevent a request from being satisfied (e.g., by an administrator configuring and/or enabling the requested storage resources) before the request has been approved.

One problem that can arise in a workflow process occurs when a resource, which is required to satisfy an outstanding service request from one user, is allocated to another user while the first user's service request is still outstanding. For example, a user can request that a logical volume be implemented on a particular storage device in response to detecting that the particular storage device is not currently in use. The user can submit the request via email. Before an administrator reviews the email, the storage device may be allocated to a different user. As a result, by the time the administrator reviews the request, the storage device is no longer available for use by the user that submitted the request. Before being able to satisfy the request, the administrator will need to either select a different storage device for use by the user or instruct the user to select a different storage device. Accordingly, situations like this can lead to reduced efficiency and are likely to frustrate users and administrators.

SUMMARY OF THE INVENTION

Various embodiments of systems and methods are disclosed for reserving storage devices pending handling of a workflow request. In one embodiment, a method involves: detecting a storage resource indication within a workflow request and, in response to the storage resource indication, generating an availability indication. The storage resource indication indicates a storage resource (e.g., by directly or indirectly identifying or selecting the storage resource). The availability indication indicates that the indicated storage resource is not available for subsequent workflow requests. The availability indication is generated prior to allowing the consumer that generated the workflow request to use the storage resource. The workflow request can include a request to allocate a logical storage structure (e.g., a volume or logical disk). The logical storage structure is allocated in response to the workflow request. If the workflow request is denied or expires, the logical storage structure is deleted.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Figure 1:
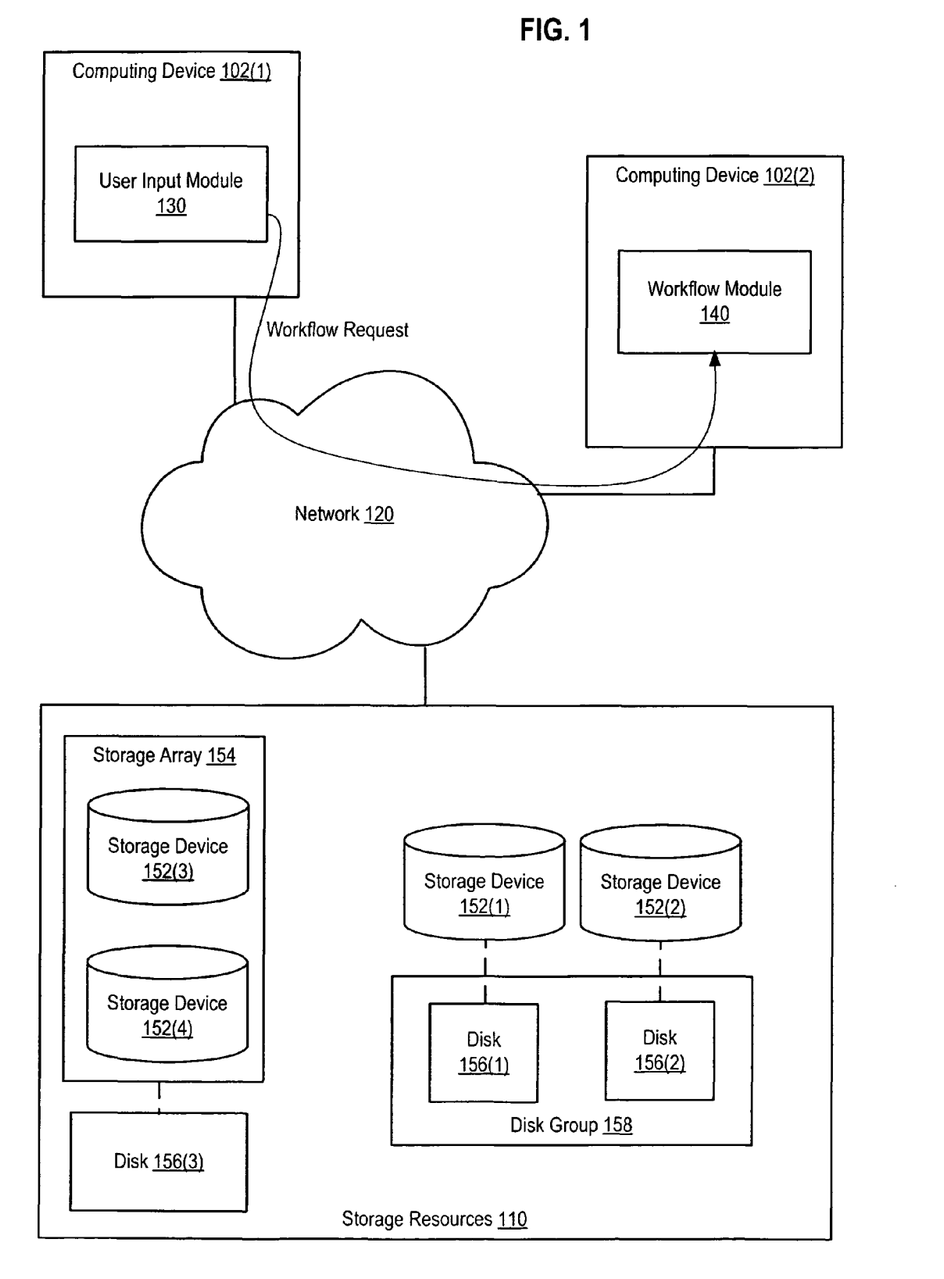
FIG. 1 shows a system that implements a workflow process for handling requests for storage devices, according to an embodiment of the present invention.

FIG. 1 shows a system that implements a workflow process for handling requests for storage devices. As shown, the system includes several computing devices 102(1) and 102(2), which are coupled to various storage resources 110 by one or more networks 120. Network 120 can include a WAN (Wide Area Network), such as the Internet, one or more LANs (Local Area Networks), and/or one or more SANs (Storage Area Networks).

Computing devices 102(1) and 102(2) (collectively referred to as computing devices 102) are examples of devices such as workstations, personal computers, servers, PDAs (Personal Digital Assistants), cell phones, network switches, storage array controllers, and the like. Computing devices 102(1) and 102(2) are used by users (e.g., administrators and/or consumers) to interact with a workflow process and/or storage resources 110. It is noted that users (both consumers and administrators) can include both people and applications.

Consumers are individuals or groups of people or applications that use one or more storage resources 110. Administrators are individuals or groups of people that configure storage resources 110 for use by consumers and/or control which storage resources 110 are provided to which consumers. Administrators can represent administrators both within the same organization as the consumers and in different organizations. For example, one administrator can be a system administrator, network administrator, and/or a budget manager within the same organization as a consumer. Another administrator can be a system and/or network administrator within another organization, which provides storage services to the first organization.

In this example, computing device 102(1) is used by a consumer of storage resources 110. The consumer can be a person using computing device 102(1) or an application executing on computing device 102(1). The consumer can submit a workflow request for a particular storage resource to the workflow process via user input module 130. For example, user input module can be an email client, and the consumer can submit a workflow request by sending an email requesting that a particular storage volume be added to a particular host. The workflow process is controlled by workflow module 140, which is implemented on computing device 102(1) in this example. User input module 130 represents any one of various devices that can be used to generate and view workflow requests, including email clients, web browsers, user interfaces to workflow module 140, electronic document editors, and the like.

Computing device 102(2) is used by an administrator who controls the allocation of storage resources 110 via the workflow process. An instance of workflow module 140 is implemented on the administrator's computing device 102(2), allowing the administrator to interact with the workflow process in order to approve, modify, and/or deny workflow requests. Workflow module 140 can also provide an interface via which the administrator can view the current configuration of storage resources being used by consumers as well as the current sets of unused storage resources and reserved storage resources. In one embodiment, workflow module 140 is implemented using Invio Storage Practice Manager, available from VERITAS Software Corp., of Mountain View, Calif.

Storage resources 110 represent various physical and logical storage resources available to consumers within the system. These storage resources can include storage resources that are co-located with (also referred to as local to) consumers (e.g., such storage resources can be part of and/or directly coupled to the consumer's computing device) and/or storage resources that are located remotely from the consumers (e.g., such storage resources can be part of a data center, accessible to the consumers via a Wide Area Network (WAN) such as the Internet). Examples of storage resources include storage devices 152(1)-152(4). Storage devices 152(1)-152(4) can include disk drives, Compact Disc (CD) or Digital Versatile Disc (DVD) drives, tape drives, and the like. Storage devices 152(3) and 152(4) are part of a storage array 154 (e.g., a Redundant Array of Independent Disks (RAID), a JBOD (Just a Bunch Of Disks) array, or the like). It is noted that storage arrays can also be treated as storage devices.

A logical storage device, disk 156(1), is associated with storage device 152(1), as indicated by the dashed line between disk 156(1) and storage device 153(1). Disk 156(1) can be created by a device or application, such as VERITAS Volume Manager™, that provides virtualized representations of physical storage. Similarly, logical disk 156(2) is associated with storage device 152(2). Disks 156(1) and 156(2) are associated with each other to form disk group 158. In this example, a single logical storage device, disk 156(3), is associated with storage array 154. An application such as VERITAS Volume Manager™ can implement a logical volume (not shown) on one or more of the disks 156(1)-156(3).

Storage resources 110 can be arranged in a variety of different locations. For example, in one embodiment, storage resources 110 are consolidated in a central location. In other embodiments, storage resources 110 are distributed throughout a campus. In still other embodiments, storage resources 110 are distributed over a wide geographic area (e.g., a city).

Workflow module 140 is a tool that is used to define, implement and manage storage services-related processes. Workflow module 140 provides a formal communication vehicle between consumers of storage resources and administrators of storage resources. Workflow module 140 provides a mechanism via which administrators can define the storage resources (or services provided by those storage resources), consumers can request storage resources (e.g., by subscribing to one of several services) by generating a workflow request, consumers and/or administrators can approve of the workflow request, an administrator can process the workflow request (e.g., by configuring a requested storage resource for use by the consumer who made the request), and consumers and/or administrators can receive confirmation that the workflow request has been processed.

Figure 2:
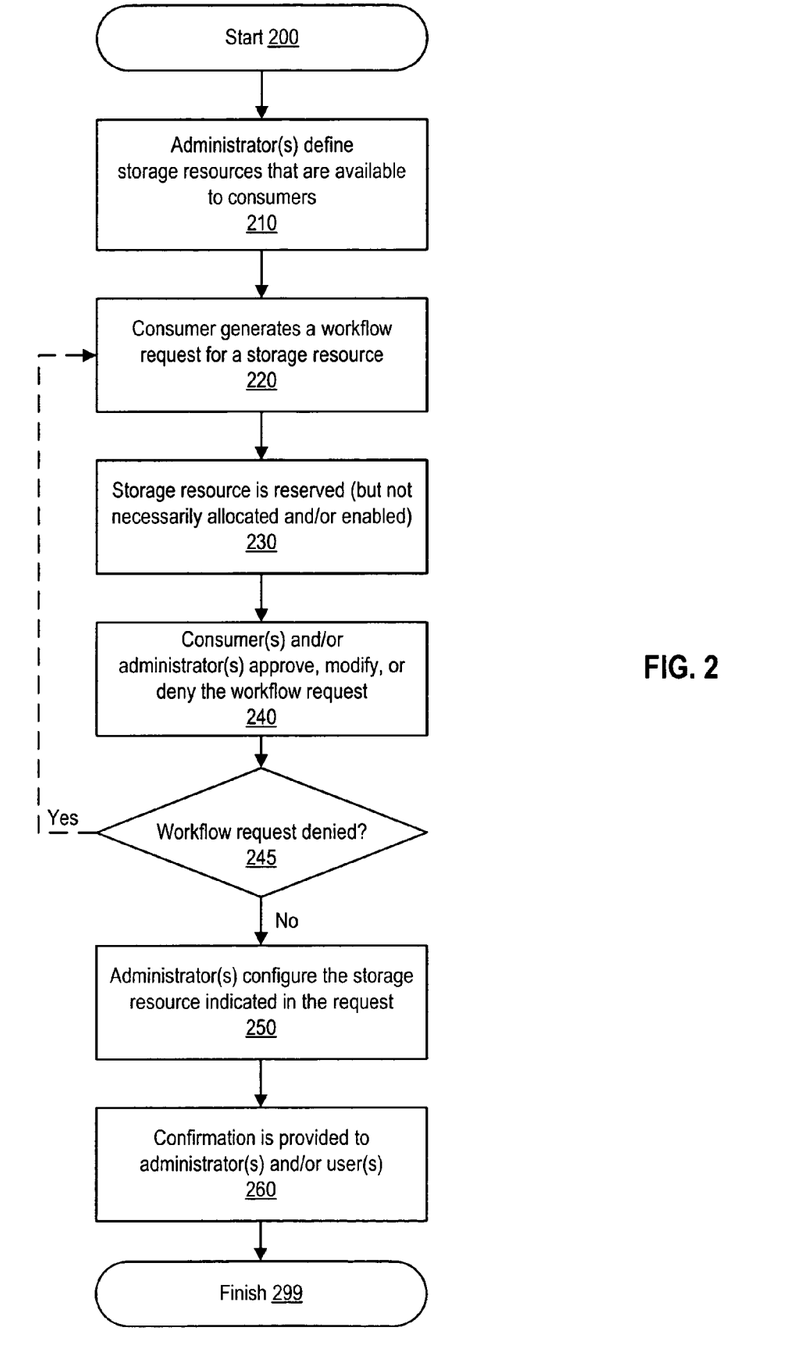
FIG. 2 is a flowchart of a workflow process that includes reservation of requested storage resources pending workflow request approval, according to one embodiment of the present invention.

FIG. 2 is a flowchart of a workflow process that includes reservation of requested storage resources pending workflow request approval. This process can be controlled by a workflow tool such as workflow module 140 of FIG. 1. The administrators and consumers that interact via the workflow process can include people, hardware, and/or software. For example, a consumer can be an application that requires additional storage. Similarly, an administrator can be an automated storage provisioning tool. It is noted that, for a given workflow process, more than one workflow request may be outstanding at the same time, but for simplicity, only one workflow request is illustrated in FIG. 2. The method begins at 200.

The workflow tool allows administrators to define one or more storage resources (or storage services that are provided by various storage resources) that can be requested by consumers, as shown at 210. A definition can include a storage resource and/or service description, descriptions of one or more service tiers (if different levels of the service are being offered), service level agreements (SLAs), service cost information, and/or workflow information. In one embodiment, an application such as VERITAS Volume Manager™ provides the storage resource definitions. The definitions can be implemented in documents (e.g., portable document format (PDF) documents, text documents, and the like) that are edited by administrators and accessed by consumers.

The description portion of the definition identifies a particular storage resource and/or service provided by that storage resource, as well as details associated with that particular storage resource and/or service. For example, the following services can be described: primary storage services; data protection (e.g., backup) services; and high availability (e.g., clustering) services. Each service is associated with one or more storage resources. Alternatively, instead of describing services provided by the different storage resources, the different storage resources can be explicitly described. As noted above, relative service tiers, cost, and/or SLAs can also be described in the definition.

The workflow portion of the definition describes the workflow process (e.g., as shown at 210-260 in FIG. 2) for requesting and receiving the storage resources and/or services described in the description portion of the definition. The workflow process controls, among other things, how a workflow request for a storage resource is generated, how the workflow request is approved, denied or modified, and how the workflow request is satisfied. The workflow portion of the definition can define the class of persons and/or applications that can be consumers and administrators. The workflow portion of the definition can also define which consumers (e.g., managers who control department expenditures) and/or administrators are required to approve a workflow request before the workflow request can be satisfied. Similarly, the workflow portion can define which administrators are responsible for satisfying the workflow request as well as which consumers and/or administrators will be notified upon satisfaction of the workflow request.

Once the services and/or storage resources available to consumers have been defined, consumers can begin generating workflow requests that identify those storage resources and/or services, as shown at 220. A consumer can generate a workflow request in a variety of different ways. For example, a consumer can create a workflow request by typing information identifying a requested storage resource in an email and emailing this workflow request to an administrator, manager, and/or to the workflow module. Alternatively, the workflow module can include a web interface. Consumers can access the web interface via a web browser in order to generate workflow requests. For example, a consumer can select storage resources by selecting one or more options from a set of options (e.g., in a menu) included in a web page. As yet another alternative, an instance of a workflow module can execute on consumers' computing devices, providing a user interface via which users can generate workflow requests. As another example, a consumer can generate a workflow request by editing a document and sending that document to an administrator and/or manager via inter-office mail.

Each workflow request includes information that indicates the particular storage resource (or set of storage resources) that is being requested. In some embodiments, workflow requests explicitly identify the storage resource that is being requested. For example, a workflow request can specify one or more particular hard drives or storage arrays, or a portion of such storage devices.

In other embodiments, such as those where consumers use workflow requests to request various services, the information indirectly identifies the storage resource being requested. For example, a user can request a type of storage resource without actually specifying any one storage resource of that type. A workflow module can maintain information identifying the type of each available storage resource. The workflow module uses this information to select a storage resource of the specified type in response to the workflow request. As another example, a user can select a particular tier of primary storage service. Workflow module 140 can maintain information identifying the storage resources that are available (e.g., not already being used by other consumers) and capable of provide that particular tier of primary storage service. Thus, by specifying the particular tier and type of service, the workflow request indicates a particular storage resource or group of storage resources. It is noted that workflow requests can indirectly specify storage resources in a variety of other ways (in addition to and/or instead of specifying a particular tier and/or type of service), including requesting a number of bytes of storage, requesting a number of bytes of storage for a particular purpose, requesting a file system or volume, requesting room in which to grow an existing file system or volume, and the like. In such situations, the workflow request indicates portion(s) of one or more potentially usable storage devices by indicating the size, number, and/or purpose for which the storage is requested. For example, a workflow request for additional storage in which to grow an existing volume or file system indicates one or more storage resources that provide the requested amount of additional storage as well as having an appropriate layout and/or other criteria needed to be compatible with the existing volume or file system.

It is noted that in some situations, a workflow request can directly identify certain storage resources and indirectly identify other storage resources. For example, a workflow request can request an additional 60 MB of storage, of which 20 MB is available from a local storage resource, such that an additional 40 MB is requested from any one of several storage resources that are not already allocated to the local system. Thus, the workflow request directly identifies the 20 MB of the local storage resource and indirectly identifies the 40 MB of the non-local storage resource.

In one embodiment, each workflow request includes information identifying a type of service (e.g., backup, data storage, and so on, which in turn indicates one or more storage resources), a host (e.g., a computing device that will be used by the consumer when accessing the indicated storage resource(s)), and a department (e.g., the department that includes the consumer generating the workflow request). The information in the workflow request is used by the workflow process to determine which administrators and/or consumers need access to the workflow request in order to approve the workflow request, which administrators need access to the workflow request in order to satisfy the workflow request, and which administrators and/or consumers should receive status updates (e.g., such as confirmation that the workflow request has been satisfied) corresponding to the workflow request.

In response to the workflow request, a storage resource indicated in the workflow request is reserved, as shown at 230. Reserving the storage resource inhibits the storage resource from being provided to other consumers by the workflow process. The storage resource is reserved prior to the time at which the workflow process allows the requester (the consumer that generated the workflow request) to access the storage resource. For example, the resource is reserved prior to the time at which the workflow request is approved.

The storage resource can be reserved by updating state information associated with the storage resource to indicate that the storage resource is reserved. For example, a flag associated with the storage resource can be set and cleared to indicate whether the storage resource is currently reserved. Reservation of the indicated storage resource can be performed by the workflow tool or by an application that generates the workflow request. For example, the workflow tool can include an agent that performs storage resource reservations in response to detecting workflow requests. Alternatively, an application that generates workflow requests can include functionality that updates the state information in order to reserve the storage resource.

In embodiments in which workflow requests indirectly indicate storage resources (e.g., by indicating a quantity of storage from a particular group, class, or tier of storage resources), reserving an indicated storage resource can be performed by reserving an appropriate number of storage resources from the requested class. For example, if a consumer generates a workflow request that specifies a particular amount of storage from a class of storage devices, a specific one of those storage devices, which provides the specified amount of storage, can be reserved. Alternatively, the amount of storage can be reserved without actually reserving a specific storage device. For example, if 100 MB of "Class A" storage is available from a pool of storage resources, and if a workflow request specifies 10 MB of "Class A" storage, one or more storage resource(s) can be reserved by updating state information associated with the pool of storage resources to indicate that only 90 MB of "Class A" storage is available and/or to indicate that 10 MB of "Class A" storage is currently reserved. Similarly, if 10 storage devices are available and are equivalent to each other, and if the workflow request indicates that two of those storage devices are requested, state information can be updated to indicate that two of the storage devices are reserved, without actually reserving two specific storage devices. As a result, a menu option corresponding to those storage devices will now indicate that the number of available (non-reserved, not-in-use) devices is eight.

It is noted that in some embodiments, a workflow request can specify some storage resources that can be reserved and other storage resources that cannot be reserved. Similarly, in some embodiments, certain storage resources indicated in the workflow request can be reserved immediately after the workflow request is generated, while other storage resources indicated in the workflow request cannot be reserved until the workflow request has been at least partially approved. As an example of such a situation, a consumer (e.g., a volume virtualization application, such as VERITAS Volume Manager) can generate a workflow request for a certain amount of storage space, or a certain number of storage devices, in order to grow an existing volume. The workflow request can be partially satisfied by allocating local storage space to the existing volume; however, additional storage space is needed to fully satisfy the workflow request. In such a situation, the consumer can reserve the local storage space in response to generating the workflow request. The remaining storage space may not be reserved, or may be reserved at a later time (e.g., upon approval of the workflow request by a storage administrator). It is noted that if the workflow request is denied, the consumer can release the portion of the requested storage that was reserved.

The workflow tool can inhibit a reserved storage resource from being provided to other consumers while the workflow request is pending in a variety of ways. If the workflow tool provides consumers with an interface for specifying workflow requests, that interface can display available services and/or storage resources based on which storage resources are currently being used by other consumers and which storage resources are currently reserved. For example, if all of the storage resources capable of providing a given service are already in use or reserved, that service can be excluded from a list of services provided to consumers specifying workflow requests. Additionally, the workflow tool can allow administrators to view information identifying the storage resources that are currently free. Only storage resources that are not currently in use and not reserved will be identified in this information. Accordingly, an administrator who views that information is unlikely to select a reserved storage resource for allocation to another consumer, since the reserved storage resource will not be identified in the information.

When a storage resource is reserved, that storage resource does not need to be allocated, configured, and/or enabled. Enabling the storage resource involves configuring the storage resource so that the storage resource can be accessed and used (enablement is not necessarily specific to the consumer that generated the workflow request). For example, enabling a disk array can involve turning the disk array on. Configuring the storage resource involves configuring the storage resource such that it can be used by the particular consumer (and, in some circumstances, only that particular user) that generated the workflow request. For example, a storage device can be configured by setting up the appropriate network connections to allow the consumer to access the storage device. Allocation is performed for logical storage resources. For example, if a consumer requests a logical volume on a particular disk array, the volume can be allocated on the disk array by creating a new volume on that disk array.

Performing the enablement, configuration, and allocation of a storage resource may consume a significant amount of administrator effort. Thus, if allocation, configuration, and enablement are not performed at the time that the storage resource is reserved, any automated and/or manual effort needed to allocate and/or enable the storage resource can be delayed until the workflow request is actually approved. As a result, if the workflow request is denied or modified to indicate a different storage resource, no unnecessary effort will have been expended. However, in alternative embodiments, the storage resource can be configured and/or enabled prior to approval of the corresponding workflow request (e.g., in one embodiment, allocation and/or enablement take place at the same time as reservation; however, a resource that is allocated or enabled will not typically be used until approved).

Some workflow requests implement a combination of the above techniques, such that some of the indicated storage resources are configured or enabled upon reservation, while other of the indicated resources are not. The other indicated resources will be allocated or enabled through the workflow process. For example, if a workflow request specifies a request for a new volume for a particular host, and if volume allocation can be partially satisfied from storage that is already allocated to that host, then the local storage can be reserved by allocating the local storage as a portion the new volume, leaving empty regions in the volume's virtual address space to be filled in eventually by additional storage. The additional storage will be allocated and enabled through the workflow process.

It is noted that a storage resource can be allocated at the same time that the storage resource is reserved. For example, in response to a workflow request that specifies a logical storage resource (e.g., a volume), the workflow process can allocate and reserve all or part of that logical storage resource. By allocating the logical storage resource at this time (prior to the requester being approved to use the logical storage resource), the space (or a portion of the space) needed to store the logical storage resource (or a portion of the logical storage resource) is reserved. It is noted that, during the workflow process, the allocated portion of the logical storage resource can be modified. For example, if an administrator decides to allocate the portion of the logical storage resource on a different physical storage device, the administrator may deallocate the reserved physical storage (and update the associated state information to indicate that the physical storage is no longer reserved) and reallocate that portion of the logical storage resource on the other physical storage device.

At 240, one or more consumers and/or administrators approve, modify, or deny the workflow request. For example, if a consumer, Bob, generates a workflow request for a new hard drive, Bob's manager Carl (also a consumer) may review the workflow request to ensure that budgeting constraints for Carl's division within the company are met. A storage administrator, Debbie (an administrator), also reviews Bob's workflow request to make sure that satisfying the workflow request would not adversely affect the planned allocation of storage resources among the company. Carl and Debbie can each approve or deny the workflow request.

The particular consumers and/or administrators required to approve of a workflow request before that workflow request is satisfied (e.g., by provisioning the requested storage resource) can vary among the different consumers who generate workflow requests as well as among the different storage resources. If more than one consumer and/or administrator are required to approve of a workflow request, all of those consumers and/or administrators should approve of the workflow request before the workflow request is satisfied. If any of the reviewers deny the workflow request, the workflow request should not be satisfied. In some embodiments, only certain reviewers (e.g., administrators) are allowed to modify workflow requests. A reviewer can modify a workflow request by updating the workflow request to specify a different storage resource and/or service, which in turn can cause the workflow request to indicate a different storage resource.

The reviewers can approve, modify, and/or deny workflow requests in a variety of ways. For example, in one embodiment, reviewers may interact with the workflow tool via a web interface that displays outstanding workflow requests. In another embodiment, reviewers may access a directory that stores outstanding workflow requests (e.g., as text files). In such an embodiment, a reviewer can indicate whether that reviewer approves, modifies, or denies the workflow request using techniques such as editing the workflow request or printing out a copy of the workflow request and signing the printed copy. In still other embodiments, reviewers access email copies of workflow requests and generate corresponding emails indicating whether each workflow request is approved, modified, or denied.

A workflow request can be modified by an administrator if the administrator determines that another storage resource would better satisfy the consumer's workflow request than the storage resource indicated in the workflow request. For example, if a consumer, who would access the storage resource via a host located in Building A, generates a workflow request indicating a storage resource in Building C, and if a suitable storage resource is located in Building A, the administrator can modify the workflow request to indicate the storage resource in Building A instead of the storage resource in Building C. Administrators can similarly modify workflow requests for various other reasons, such as adjusting the cost of satisfying the workflow request or providing a better utilization of storage resources. It is noted that an administrator can be an automated process, which can evaluate and/or modify workflow requests based on pre-specified policies.

If the workflow request is denied by any of the reviewers, as determined at 245, the workflow request can be returned to the consumer that generated the workflow request (as indicated by the dashed line), allowing the consumer to edit and/or resubmit the workflow request. Alternatively, the workflow request can simply be discarded (not shown).

If the workflow request is not denied (i.e., if the workflow request is approved and/or modified by all reviewers), the workflow request is provided to an administrator (or set of administrators). The administrator allocates, configures, and/or enables the storage resource indicated in the workflow request, as indicated at 250. If the storage resource has already been allocated, configured, and/or enabled (e.g., at the time the storage resource was reserved), the administrator can confirm the previous configuration, allocation, and/or enablement.

Function 250 can be manual or automated, or a combination of both. For example, one or more administrators may be responsible for configuring and enabling the storage resource indicated in a workflow request. Once the workflow request has been approved, the workflow request is provided to the responsible administrator(s) (e.g., via email). The administrator(s) then use the information included in the workflow request to manually configure and enable the storage resource. Alternatively, upon approval, the workflow request can be provided to a pre-defined automated process executing on an administrator console, which then configures and enables the storage resource according to the information in the workflow request. The administrators can also revoke the reservation of the storage resource, in response to configuration and enablement of the storage resource.

After the storage resource has been configured, at 250, confirmation that the workflow request has been satisfied is provided to one or more administrators and/or users, as indicated at 260. For example, an email, indicating that the storage resource has been allocated to the consumer, can be sent to the consumer who generated the workflow request. Additional emails can be sent to other interested parties (e.g., the consumer's manager, a system administrator, and the like). Confirmations can also be sent via techniques other than email (e.g., fax, instant message, text messaging, and so on). As with the previous functions, performance of function 260 can be manual, automated, or a combination of both. The workflow process ends (for the workflow request generated at 220) at 299.

The workflow process shown in FIG. 2 provides a framework for handing workflow requests in an efficient order. For example, the workflow process indicates that a workflow request should be approved (at 240) before the storage resource indicated in the workflow request is actually allocated (at 250). In some embodiments, the workflow tool enforces a particular order on the handling of workflow requests. In other embodiments, the workflow tool provides consumers and/or administrators with information identifying a preferred order, without actually enforcing that order.

Figure 3:
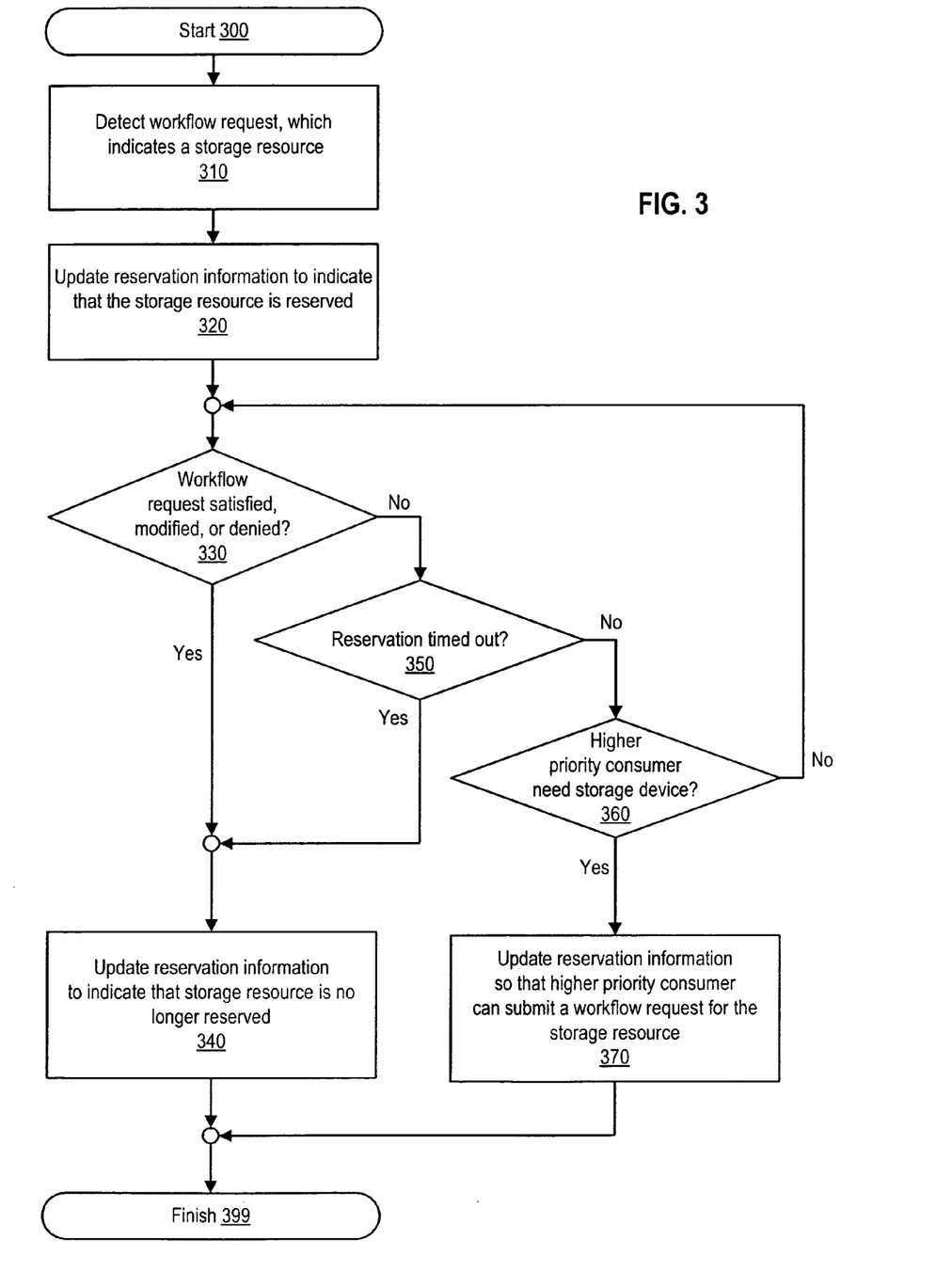
FIG. 3 illustrates a method of using an indication associated with a storage resource to reserve the resource in response to a pending workflow request, according to one embodiment of the present invention.

FIG. 3 illustrates a method of using reservation information associated with a storage resource to reserve the resource in response to a pending workflow request. This flowchart illustrates more details of function 230 of FIG. 2. The method beings at 300.

At 310, a new workflow request is detected. The workflow request indicates a storage resource. Various techniques can be used to detect the workflow request, depending upon how workflow requests are embodied (e.g., in electronic documents, in emails, in printed documents, and so forth) and conveyed (e.g., via email, mail, hand delivery, and the like). For example, in one embodiment, detection of the workflow request can involve sending or receiving an email, which includes the workflow request. As another example, detection of the workflow request can occur in response to a consumer specifying the workflow request via a web browser.

In response to detection of a new workflow request, the storage resource (or resources) indicated in the workflow request are reserved by generating an indication that the storage resource(s) are no longer available, as shown at 320. For example, in one embodiment, the reservation information is implemented as a single bit that is set to indicate that the storage resource is reserved and cleared to indicate that the storage resource is not reserved. If the bit is set, the storage device should not be specified in workflow requests (because the storage device has already been reserved), nor can the storage device be accessed. If the bit is cleared, the storage resource can be accessed and specified in workflow requests, if the storage resource is not already being used by another consumer. It is noted that, in alternative embodiments, the reservation information is implemented using more than one bit (e.g., the reservation information can include information indicating whether the storage resource is reserved, information identifying the consumer and/or workflow request for which the storage resource is reserved, and so on).

If the workflow request is satisfied, modified, or denied, as determined at 330, the reservation information can be updated to indicate that the storage resource is available and/or accessible, as shown at 340. For example, if the workflow request is satisfied, the reservation information can be updated to indicate that the storage resource is accessible, allowing the consumer that generated the workflow request to begin accessing the storage resource. As another example, if the workflow request is modified to indicate another storage resource (i.e., after modification, the workflow request no longer indicates the storage resource), the reservation information can be updated to indicate that the storage resource is no longer reserved, allowing the storage resource to be specified in other workflow requests. The reservation information can similarly be updated if the workflow request is denied. If a logical storage resource was allocated in response to the workflow request, that logical storage resource can be deleted when the workflow request is denied.

If a workflow request is modified to indicate a different storage resource, the modified workflow request can be handled as a new workflow request (e.g., as shown at 310 and 320). Thus, a different storage resource can be reserved in response to the modification of a workflow request.

It is noted that in certain situations, a workflow request may not be approved, modified, denied, and/or satisfied in a timely manner. In such situations, it may be desirable to cancel the reservation of the storage resource so that the storage resource is not indefinitely removed from the pool of available storage resources. In the illustrated embodiment, reservations "time out," or expire, a certain amount of time after the reservations are created. For example, when the reservation information is updated at 320, a counter or timer can be initialized. When this counter or timer reaches a prespecified value (e.g., by counting down to zero or counting up to a prespecified threshold value), the reservation times out. Thus, as shown at 350, if the reservation has timed out, the reservation information can be updated to indicate that the storage resource is no longer reserved, as shown at 340. Accordingly, if a workflow request is not handled in a timely manner, the storage resource(s) indicated in that workflow request can be returned to the pool of available storage resources. The consumer that generated the original workflow request can be notified (not shown) that the reservation has expired, allowing the consumer to resubmit the workflow request specifying the storage resource. In some embodiments, a consumer can specify a timeout period and/or expiration date for the workflow request when creating the workflow request. For example, a consumer can indicate that the workflow request should expire 30 days after being generated, if the workflow request has not been approved within those 30 days.

In the illustrated embodiment, different consumers have different priorities with respect to the workflow process. If a higher priority consumer needs a storage resource that has already been reserved by a lower priority consumer, as detected at 360, the workflow process updates the reservation information in such a way that allows the higher priority to submit a workflow request for the storage resource, as shown at 370. For example, a software process that provides data protection (e.g., through mirroring or replication techniques) for critical company data can have a higher priority than a person requesting a storage resource for personal use. If the software process needs a storage resource (e.g., due to the failure of one of the storage resources being used by the storage process) that has already been reserved by the person, the workflow process can update the reservation information to indicate that the storage resource is no longer reserved, allowing the higher priority resource to then specify the storage resource in a workflow request. When the reservation information is updated, the original workflow request can be modified. The method ends at 399.

While the above example shows the workflow process updating the reservation information in order to allow a higher priority consumer to request a reserved storage resource, it is noted that alternative embodiments can support consumer priorities in other ways. For example, in one embodiment, higher priority consumers are allowed to generate workflow requests for storage resources that have been reserved by lower priority consumers. In such an embodiment, the reservation information associated with each storage resource can include information identifying multiple pending workflow requests (e.g., a set of reservation information associated with a storage volume could identify that the storage resource had been reserved in response to more than one workflow request). In one such embodiment, if a lower priority workflow request (i.e., a workflow request generated by a lower priority consumer) indicates the same storage resource as a higher priority workflow request (i.e., a workflow request generated by a higher priority consumer), the lower priority workflow request cannot be approved until the higher priority workflow request has been either modified or denied. If the higher priority workflow request is approved, the lower priority workflow request should be denied or modified to indicate a different storage resource.

It is noted that techniques other than the method shown in FIG. 3 can also be used to reserve a storage resource. For example, in one embodiment, the workflow process maintains information indicating whether each storage resource is currently reserved or not. This information is updated to indicate that a storage resource is reserved in response to detection of a workflow request that indicates that storage resource. Unlike the indication maintained in FIG. 3, this information may not control whether consumers can access the storage resource. In such an embodiment, the consumer that generated a workflow request can begin accessing the storage resource as soon as the workflow request is satisfied, without waiting for the reservation information to be updated (since an indication that the storage resource is reserved will not prevent access to the storage resource). Such an embodiment can be implemented in a manner similar to that shown in FIG. 3, but certain functions, such as determination 330, may be omitted (e.g., the reservation information may only be updated to indicate that a storage resource is no longer reserved when the reservation times out, as detected at 340).

By maintaining information identifying reserved storage resources, consumers and/or administrators can be provided with information that identifies the current status of storage resources managed by the workflow process. This allows consumers to generate workflow requests that are less likely to conflict with other pending workflow requests. For example, if a consumer sees that a particular storage resource has already been reserved, the consumer can choose to specify a different storage resource in a workflow request. As another example, the workflow process can control the generation of workflow requests (e.g., through the use of auto-populated pull-down menus) such that consumers can only specify storage resources that have not already been reserved.

Similarly, the reservation information allows administrators to view potential allocations of storage resources. For example, an administrator can request information identifying available, reserved, and/or allocated storage resources from the workflow module. Based on this information, the administrator can determine whether to approve, deny, or modify pending workflow requests.

Figure 4:
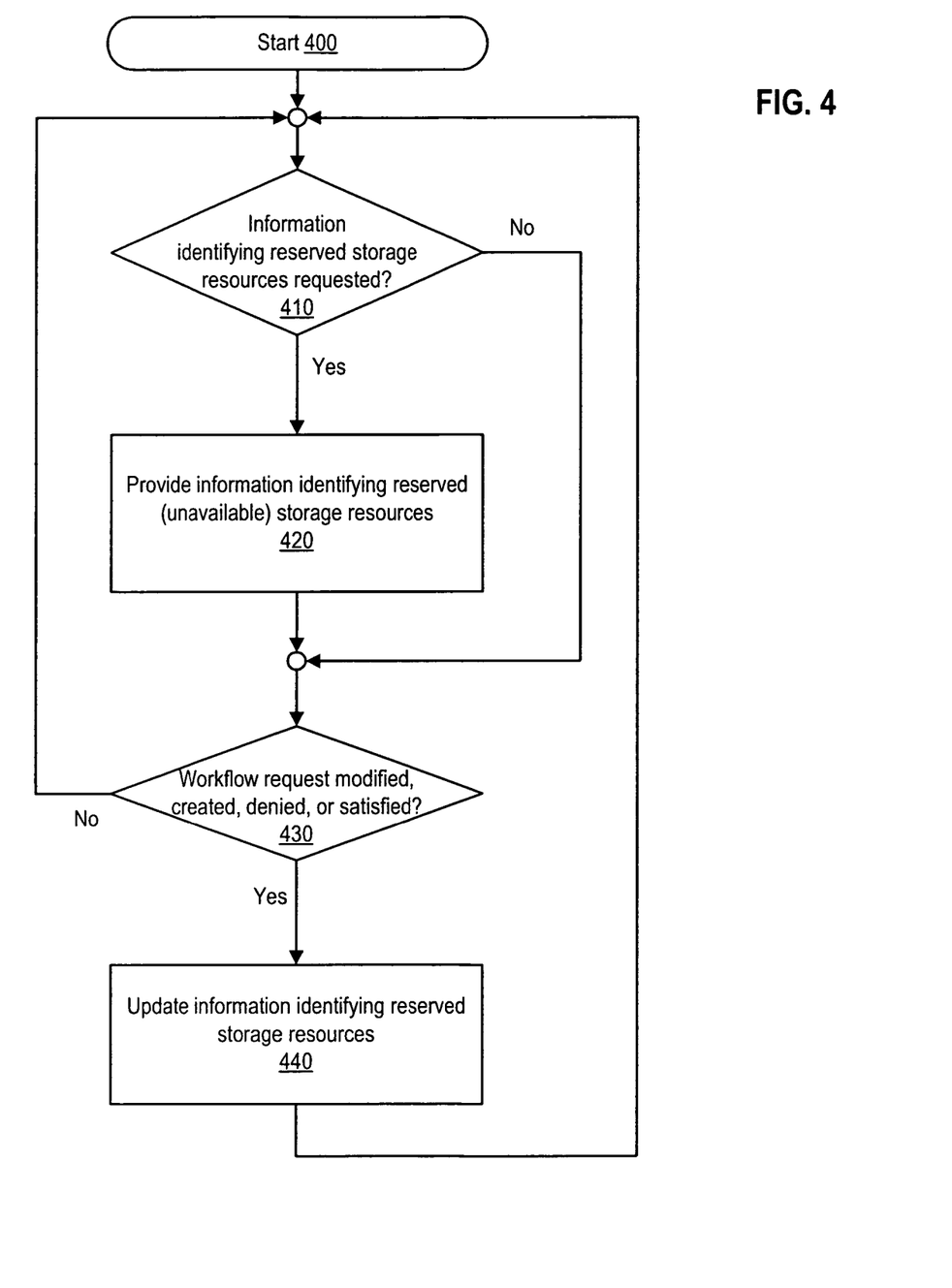
FIG. 4 shows a method of providing information identifying reserved storage resources to users, according to one embodiment of the present invention.

FIG. 4 shows a method of providing information identifying reserved storage resources to users. It is noted that similar methods can be used to provide information identifying non-reserved storage resources to users. The method begins at 400.

If a user has requested information identifying reserved storage resources, as detected at 410, the workflow process provides the requested information to the user, as shown at 420. A user can request the information in a variety of different ways. For example, in one embodiment, a consumer can select one of several storage resources from a list as part of specifying a workflow request. By selecting one of the storage resources, the consumer generates a request for information indicating whether the selected storage resource is already reserved. If the selected storage resource is already reserved, as determined by accessing reservation information associated with the selected storage resource, the workflow process can provide an error message (e.g., "The selected storage resource is already reserved. Please select another storage resource") that indicates that the storage resource is reserved to the consumer. As another example, an administrator can request a list of all storage resources that are currently reserved (e.g., by sending an email to the workflow process). In response, the workflow process accesses reservation information associated with each storage resource in order to generate a list of storage resources that are currently reserved. If a workflow request is modified, generated, denied, or satisfied, as detected at 430, the reservation information associated with one or more storage resources is updated at 440 (e.g., as shown in FIG. 3).

Figure 5:
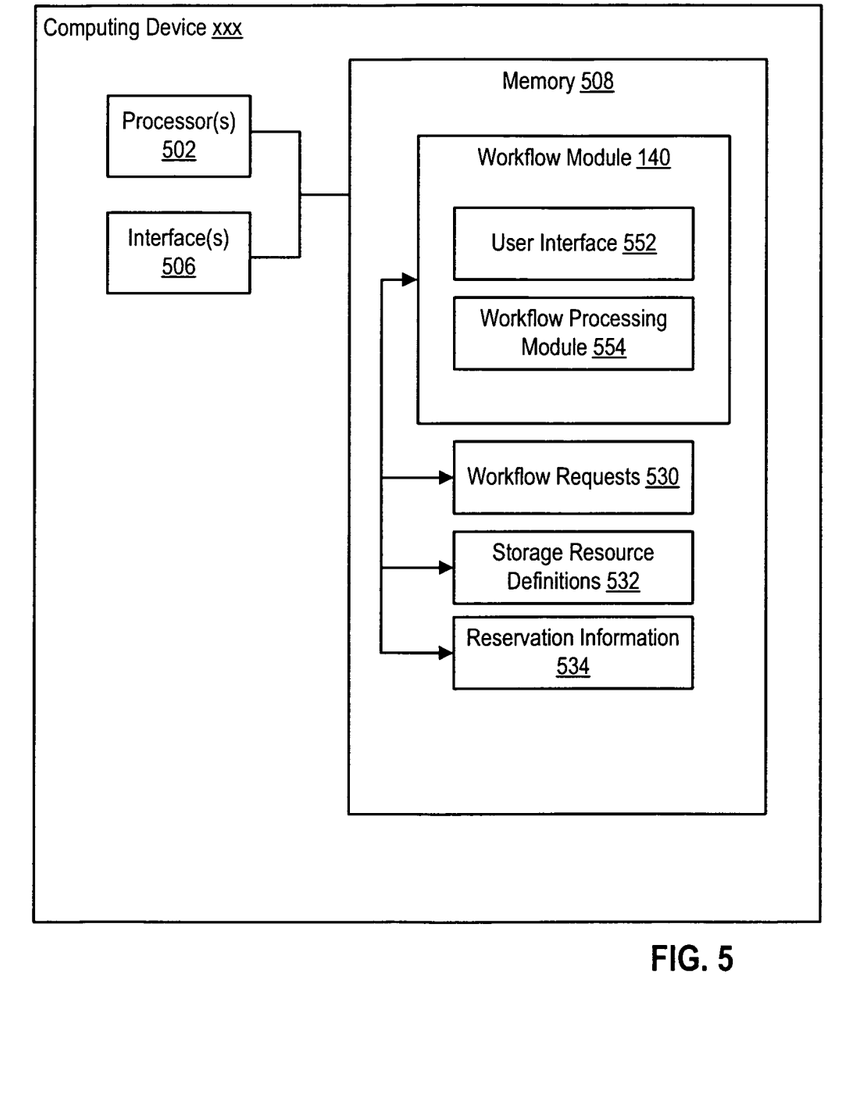
FIG. 5 is a block diagram of a computer system, according to one embodiment of the present invention.

FIG. 5 is a block diagram of computing device 102(2) illustrating how workflow module 140 can be implemented in software. As illustrated, computing device 102(2) includes one or more processors 502 (e.g., microprocessors, PLDs (Programmable Logic Devices), or ASICs (Application Specific Integrated Circuits)) configured to execute program instructions stored in memory 508. Memory 508 can include various types of RAM (Random Access Memory), ROM (Read Only Memory), Flash memory, MEMS (Micro Electro-Mechanical Systems) memory, and the like. Computing device 102(2) also includes one or more interfaces 506. Processor 502, interface 506, and memory 508 are coupled to send and receive data and control signals by a bus or other interconnect.

Interface(s) 506 can include an interface to a storage device (e.g., a non-volatile storage device on which program instructions implementing workflow module 140 and/or workflow requests 530, storage resource definitions 532, and/or reservation information 534 are stored). Interface(s) 506 can also include an interface to network 120 (as shown in FIG. 1), for use in providing consumers and/or administrators access to workflow requests 530, storage resource definitions 532, and/or reservation information 534.

In this example, workflow module 140, as well as workflow requests 530, storage resource definitions 532, and reservation information 534, are stored in memory 508. As shown, workflow module 140 includes user interface 552 and workflow processing module 554. In one embodiment, workflow module 140 provides consumers and/or administrators with access to workflow requests via user interface 552. For example, in one embodiment, user interface 552 is a graphical user interface via which a consumer can input a workflow request and/or an administrator can approve, modify, or deny a workflow request. User interface 552 can also provide consumers and/or administrators with access to information (e.g., lists, charts, diagrams, and the like) identifying which storage resources are currently available, allocated, and/or reserved. For example, based on reservation information 534, which indicates whether one or more storage resources are currently reserved, user interface 552 can display a list of reserved (or non-reserved) storage resources to a consumer for use in specifying a content request.

Workflow processing module 554 controls access to workflow requests 530 such that particular workflow policies (e.g., as specified in storage resource definitions 532) are satisfied. For example, workflow processing module can prevent an administrator from satisfying a workflow request until the workflow request has been approved by each of several administrators).

The program instructions and data implementing workflow module 140 can be stored on various computer readable media such as memory 508. In some embodiments, workflow module software is stored on a computer readable medium such as a CD (Compact Disc), DVD (Digital Versatile Disc), hard disk, optical disk, tape device, floppy disk, and the like). In order to be executed by processor 502, the instructions and data implementing workflow module 140 are loaded into memory 508 from the other computer readable medium. The instructions and/or data implementing can also be transferred to computing device 102(2) for storage in memory 508 via a network such as the Internet or upon a carrier medium. In some embodiments, a computer readable medium is a carrier medium such as a network and/or a wireless link upon which signals such as electrical, electromagnetic, or digital signals, on which the data and instructions implementing workflow module 140 are encoded, are conveyed.

Although the present invention has been described in connection with several embodiments, the invention is not intended to be limited to the specific forms set forth herein. On the contrary, the invention is intended to cover such alternatives, modifications, and equivalents as can be reasonably included within the scope of the invention as defined by the appended claims.

What is claimed is:

1. A method comprising:
   detecting a request for a storage resource, wherein
      the request is generated by a requester;
   in response to detection of the request and prior to approval of the request:
      selecting a storage resource from a pool of available storage resources, wherein the selected storage resource will be allocated to the requester if the approval is given and
      reserving the selected storage resource, wherein the reserving comprises setting a flag indicating that the selected storage resource is reserved, the reserving removes the selected storage resource from the pool of available storage resources, the requester cannot access the selected storage resource until the request is approved, and any storage resource not in the pool of available storage resources is not available for subsequent requests;

subsequent to the reserving, but prior to approving the request, returning the selected storage resource to the pool of available storage resources, wherein the returning is performed in response to receiving a second request indicating that a higher-priority requester requires the selected storage resource; and approving the second request, wherein the approval is granted by an approver, and the approver is not the requester.

2. The method of claim 1, further comprising:

in response to the reserving, inhibiting an option from being identified in a set of options, wherein the option corresponds to the selected storage resource;

presenting the set of options to the requester; and generating a second request in response to the requester selecting one of a plurality of options from the set of options, wherein the second request requests that a second storage resource be allocated to the requester.

3. The method of claim 1, wherein the storage resource is a logical storage structure.

4. The method of claim 3, wherein the request also requests that a second storage resource be allocated to the requester.

5. The method of claim 4, further comprising:

allocating a portion of the logical storage structure on the selected storage resource, prior to the requester being allowed to use the logical storage structure.

6. The method of claim 1, further comprising: generating information indicating a potential storage configuration; and providing the information indicating the potential storage configuration to an administrator, wherein the potential storage configuration identifies a storage configuration that will exist if the storage resource is allocated as requested in the request, and the information is dependent on the selected storage resource.

7. The method of claim 6, further comprising:

receiving input from an administrator;

modifying the request in response to the input, wherein subsequent to the modifying, the request no longer indicates the storage resource; and the returning is performed in response to the modifying.

8. The method of claim 1, further comprising:

generating a second availability indication, wherein the request is received from a lower-priority requester, the generating the second availability indication is performed in response to detecting that a higher-priority requester requires the storage resource, and the second availability indication indicates that the request can only be satisfied if a second request corresponding to the higher-priority requester is denied.

9. The method of claim 1, wherein the request comprises information indicating a requester-specified expiration, and the requester-specified expiration indicates a time at which the selected storage resource should be returned to the pool of available storage resources, if the request is not approved prior to the time.

10. The method of claim 1, wherein the request indicates the selected storage resource by indicating a level of service of the storage resource, and by indicating that the storage resource provides data backup services.

11. The method of claim 1, further comprising:

in response to the reserving, inhibiting an option from being identified in a set of options, wherein the option corresponds to the selected storage resource.

12. The method of claim 11, further comprising subsequent to the approving the second request, determining that the higher-priority requester has released the selected storage resource; and in response to the determining, enabling the option corresponding to the selected storage resource to be identified in the set of options.

13. The method of claim 1, wherein the approver views the second request via a user interface.

14. The method of claim 1, wherein the approver approves the second request via a user interface.

15. The method of claim 1, further comprising: confirming that the selected storage resource has been allocated to the higher-priority requester, wherein a confirmation is sent to the higher-priority requester in response to the confirming.

16. A system comprising:

a processor; and a memory coupled to the processor, wherein the memory stores program instructions executable by the processor to:

detect a request for a storage resource, wherein the request is generated by a requester;

select a storage resource from a pool of available storage resources, in response to detection of the request and prior to approval of the request, wherein the selected storage resource will be allocated to the requester if the approval is given;

reserve the selected storage resource from a pool of available storage resources, in response to detection of the request and prior to approval of the request, wherein, reserving the selected storage resource comprises setting a flag indicating that the selected storage resource is reserved, the reserving the selected storage resource removes the selected storage resource from the pool of available storage resources, the requester cannot access the selected storage resource until the request is approved, and any storage resource not in the pool of available storage resources is not available for subsequent requests;

subsequent to reserving the selected storage resource, but prior to the approval of the request, return the selected storage resource to the pool of available storage resources, wherein the selected storage resource is returned to the pool of available storage resources in response to receipt of a second request indicating that a higher-priority requester requires the selected storage resource; and receive the approval of the second request, wherein the approval is granted by an approver, and the approver is not the requester.

17. The system of claim 16, wherein the storage resource is a logical storage structure, and the logical storage structure comprises at least one of a volume or a disk.

18. The system of claim 17, wherein the memory stores program instructions executable by the processor to allocate at least a portion of the logical storage structure on the selected storage resource, prior to the requester being allowed to use the logical storage structure.

19. The system of claim 16, wherein the memory stores program instructions executable by the processor to:
- generate information indicating a potential storage configuration; and
- provide the information indicating the potential storage configuration to an administrator, wherein
  - the potential storage configuration identifies a storage configuration that will exist if the storage resource is allocated as requested in the request, and
  - the information is dependent on the selected storage resource.

20. A non-transitory computer readable storage medium comprising program instructions executable by at least one processor to:
- detect a request for a storage resource, wherein
  - the request is generated by a requester;
- select a storage resource from a pool of available storage resources, in response to detection of the request and prior to approval of the request, wherein the selected storage resource will be allocated to the requester if the approval is given;
- reserve the selected storage resource from a pool of available storage resources, in response to detection of the request and prior to approval of the request, wherein,
  - reserving the selected storage resource comprises setting a flag indicating that the selected storage resource is reserved,
  - the reserving the selected storage resource removes the selected storage resource from the pool of available storage resources,
  - the requester cannot access the selected storage resource until the request is approved, and
  - any storage resource not in the pool of available storage resources is not available for subsequent requests;
- subsequent to reserving the selected storage resource, but prior to the approval the request, return the selected storage resource to the pool of available storage resources, wherein
  - the selected storage resource is returned to the pool of available storage resources in response to receipt of a second request indicating that a higher-priority requester requires the selected storage resource; and
- receive the approval of the second request, wherein
  - the approval is granted by an approver, and
  - the approver is not the requester.

21. The non-transitory computer readable storage medium of claim 20, wherein
- the storage resource is a logical storage structure, and
- the logical storage structure comprises at least one of a volume or a disk.

22. The non-transitory computer readable storage medium of claim 20, wherein the program instructions are further executable to:
- generate information indicating a potential storage configuration; and
- provide the information indicating the potential storage configuration to an administrator, wherein
  - the potential storage configuration identifies a storage configuration that will exist if the storage resource is allocated as requested in the request, and
  - the information is dependent on the selected storage resource.

* * * * *